(12) United States Patent
Jung

(10) Patent No.: US 6,795,131 B1
(45) Date of Patent: Sep. 21, 2004

(54) STRUCTURE FOR FASTENING FLAT BRAUN TUBE TO CABINET

(75) Inventor: Pyung Soo Jung, Kyongsangbuk-do (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 09/320,679

(22) Filed: May 27, 1999

(30) Foreign Application Priority Data

May 27, 1998 (KR) ........................................ 1998/19285

(51) Int. Cl.[7] .............................................. H04N 5/645
(52) U.S. Cl. ...................................... 348/836; 312/7.2
(58) Field of Search ................................ 348/826, 836, 348/839, 841, 842; 312/7.2

(56) References Cited

U.S. PATENT DOCUMENTS

| | | | | |
|---|---|---|---|---|
| 3,084,217 A | * | 4/1963 | Fiore et al. | 312/7.2 X |
| 3,643,020 A | * | 2/1972 | St. George et al. | 348/826 X |
| 4,360,838 A | * | 11/1982 | Babicz et al. | 348/836 X |
| 5,363,150 A | * | 11/1994 | Kojima | 312/7.2 X |
| 5,410,373 A | * | 4/1995 | Sagues et al. | 348/836 X |

FOREIGN PATENT DOCUMENTS

JP          A2-213032        8/1990

* cited by examiner

Primary Examiner—Thomas A. Dixon
Assistant Examiner—Michael J. Fisher
(74) Attorney, Agent, or Firm—Birch, Stewart, Kolasch & Birch, LLP

(57) ABSTRACT

Structure for fastening a flat Braun tube to a cabinet including a front cabinet portion and a rear cabinet portion, an extension forming an annular flange about a funnel and the panel of the flat Braun tube, a seat formed inside of the front cabinet portion for seating against the annular flange, and a supporting member for supporting a back surface of the annular flange, whereby compression forces are applied between seat and the back surface of the supporting member and are limited to directions orthogonal to the major surfaces of the annular flange, and substantially no compression forces are applied against peripheral edges of the annular flange.

11 Claims, 6 Drawing Sheets

STRUCTURE FOR FASTENING FLAT BRAUN TUBE TO CABINET

CROSS-REFERENCE TO RELATED APPLICATION

This application claims the right of priority under 35 U.S.C. §119 of Korean Application No. 19285/1988, filed May 27, 1998, the disclosure of which is hereby incorporated by reference.

BACKGROUND OF THE INVENTION

1. Field of the Invention

The present invention relates to a TV receiver or a monitor and, more particularly, to a structure for fastening a flat Braun tube to a cabinet, the structure being designed for protecting the Braun tube.

2. Background of the Related Art

In general, Braun tubes (or cathode ray tubes) are used as TV receivers or image displays. In particular, flat Braun tubes are increasing in use because flat Braun tubes can reduce distortion of images to provide images closer to actual images as compared to images on curved surface Braun tubes. As shown in FIG. 1, the flat Braun tube has a flat front face with a flat panel 1 having safety glass 2 bonded on a front surface thereof, and a bulb-shaped funnel section 3 bonded at a rear surface of the panel with frit glass, with an inside space thereof held at high vacuum, approximately $10$-$7$ Torr. The inside space formed by the panel 1 and the funnel section 3 has a rectangular rail-shaped frame 4 bonded on the rear surface of the panel 1, and a mask 5 fixed to the frame 4, and having a lot of fine holes therein defining a slit. A neck 3a at the rear of the funnel 3 has an electron gun 6 housed therein for emission of electron beams (thermal electrons) according to red, green and blue image signals, and deflection yokes 7 are mounted outside the neck 3a for forming vertical/horizontal uniform magnetic fields for deflecting the electron beams.

In the aforementioned flat Braun tube, upon application of a color image signal to cathodes in the electron gun 6, electron beams for the red, green and blue colors are emitted toward fluorescent material 1a coated on an inside surface of the panel 1. Unnecessary emitted electron beams are shielded by the mask 5 in electron paths, while electron beams required for reproduction of an image pass through the fine holes and finally collide onto the red, green, and blue fluorescent material 1a to reproduce a color image.

Referring to FIGS. 2 and 3, the flat Braun tube is housed in front and rear cabinet portions, and a compression band 9 is fitted to a rim of the panel 1 for fastening with the front cabinet portion 8. The compression band 9 takes the form of a rectangular frame and is fixed to an outer circumference of the outside edges of the panel 1 by a compression force. Lugs 9a are disposed at corners of the compression band 9 for fastening the compression band to the front cabinet portion 8. The compression band 9 is fastened to the panel 1, first by winding adhesive tape 10 along an outer circumference of the outside edges of the panel 1. The compression band 9 is then heated to elongate an inner circumference length of the compression band so that it is at least greater than an outer circumference length of the panel 1 and to enable insertion of the compression band 9 onto the rim of the panel 1 having the adhesive tape 10 attached thereto. Upon rapid cooling of the compression band 9, the compression band is fixed to the rim of the panel 1 due to shrinking of the compression band and adhesive bonding of the adhesive tape 10.

Referring to FIG. 3, fastening bosses 8a are affixed on a back surface of the front cabinet portion 8 which is fitted to the rim of the panel 1, so that the Braun tube 11 and the front cabinet portion 8 can be fastened by fastening the lugs 9a of the compression band 9 fixed on the rim of the panel 1 of the Braun tube 11 to the fastening bosses 8a with fastening means, such as screws 12.

Thus, the related art compression band 9 used as fastening means of the panel 1 to the front cabinet portion 8 is compressed onto the outer circumference of the outer edge of the panel 1. Eventually, there is a problem caused in that the compression force in the plane of the panel compresses the panel 1, which is relatively weak, inward at the inside of the Braun tube 11. This affects the flat Braun tube landing or explosion proof characteristics.

Also, the many steps of the fabrication process, such as heating the compression band 9 for elongation, cooling down of the compression band for fitting on the rim of the panel 1, attaching the adhesive tape 10 on the rim of the panel 1 and the like, require much work, and there is a problem with the Braun tube separating from the front cabinet portion 8 when the compression band 9 has a weak shrinking force, thus providing a poor fastening connection to the panel 1.

SUMMARY OF THE INVENTION

Accordingly, the present invention is directed to a structure for fastening a flat Braun tube to a cabinet that substantially obviates one or more of the foregoing problems due to limitations and disadvantages of the related art.

An object of the present invention is to provide a structure for fastening a flat Braun tube to a cabinet which can fix the Braun tube to a cabinet directly.

Additional features and advantages of the invention will be set forth in the description which follows, and in part will be apparent from the description, or may be learned by practice of the invention. The objectives and other advantages of the invention will be realized and attained by the structure particularly pointed out in the written description and claims herein, as well as the appended drawings.

To achieve these and other advantages and in accordance with the purpose of the present invention, as embodied and broadly described, the structure for fastening a flat Braun tube having a longitudinal axis to a cabinet which includes a front cabinet portion and a rear cabinet portion, an extension on an outer rim of a panel forming a flange about the panel of the flat Braun tube, a seat formed inside the front cabinet portion for seating the flange, and a supporting member for supporting a back surface of the extension to thereby direct all compression forces against the flange in directions parallel to the longitudinal axis.

In other aspects of the present invention, a structure is provided for fastening a flat Braun tube to a cabinet including a front cabinet portion and a rear cabinet portion, an extension on an outer rim of a panel forming a flange about a funnel and the panel 1 of the flat Braun tube, a seat formed in a first portion inside the front cabinet portion for seating the first portion of the extension, a groove formed in a second portion inside the front cabinet portion for inserting the second portion of the flange, and a supporting member for supporting a back surface of the flange against the seat.

In another aspect of the present invention, a structure is provided for fastening a flat Braun tube to a cabinet including a front cabinet portion and a rear cabinet portion, an extension on an outer rim of a panel forming a flange about the flat Braun tube, a seat formed inside the front cabinet for seating the flange, and a supporting portion extending from the rear cabinet portion for supporting a back surface of the flange.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention, and wherein.

DETAILED DESCRIPTION OF THE PREFERRED EMBODIMENTS

Figure 1:
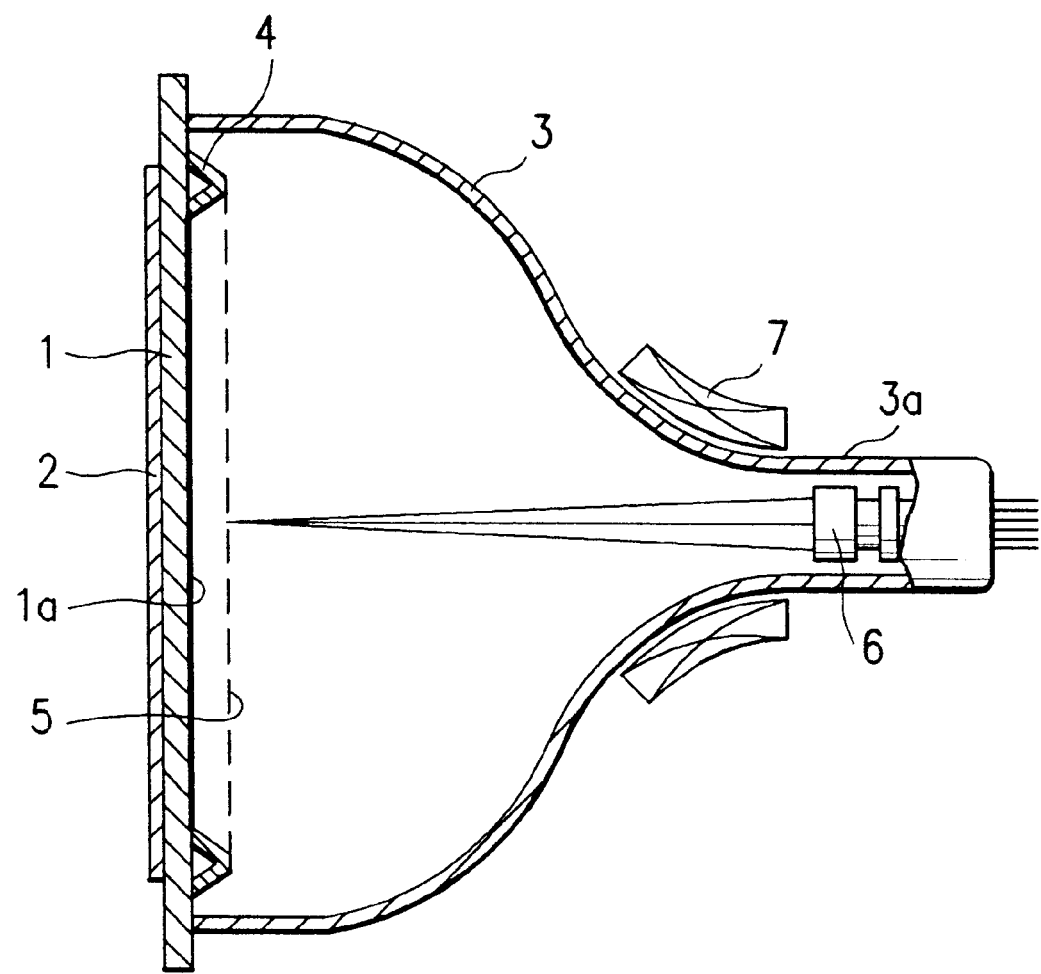
FIG. 1 illustrates a section of a conventional flat Braun tube.
Figure 2:
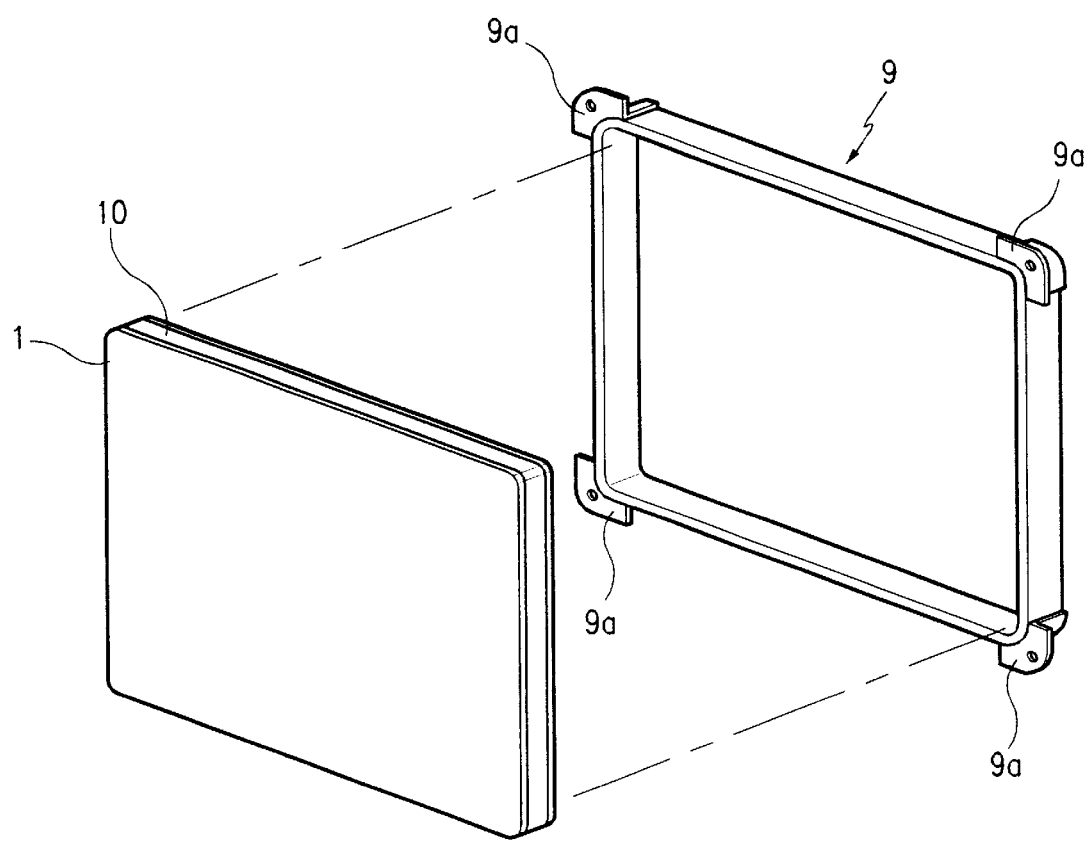
FIG. 2 illustrates a disassembled perspective view of a related art compression band surrounding a flat panel of a flat Braun tube.
Figure 3:
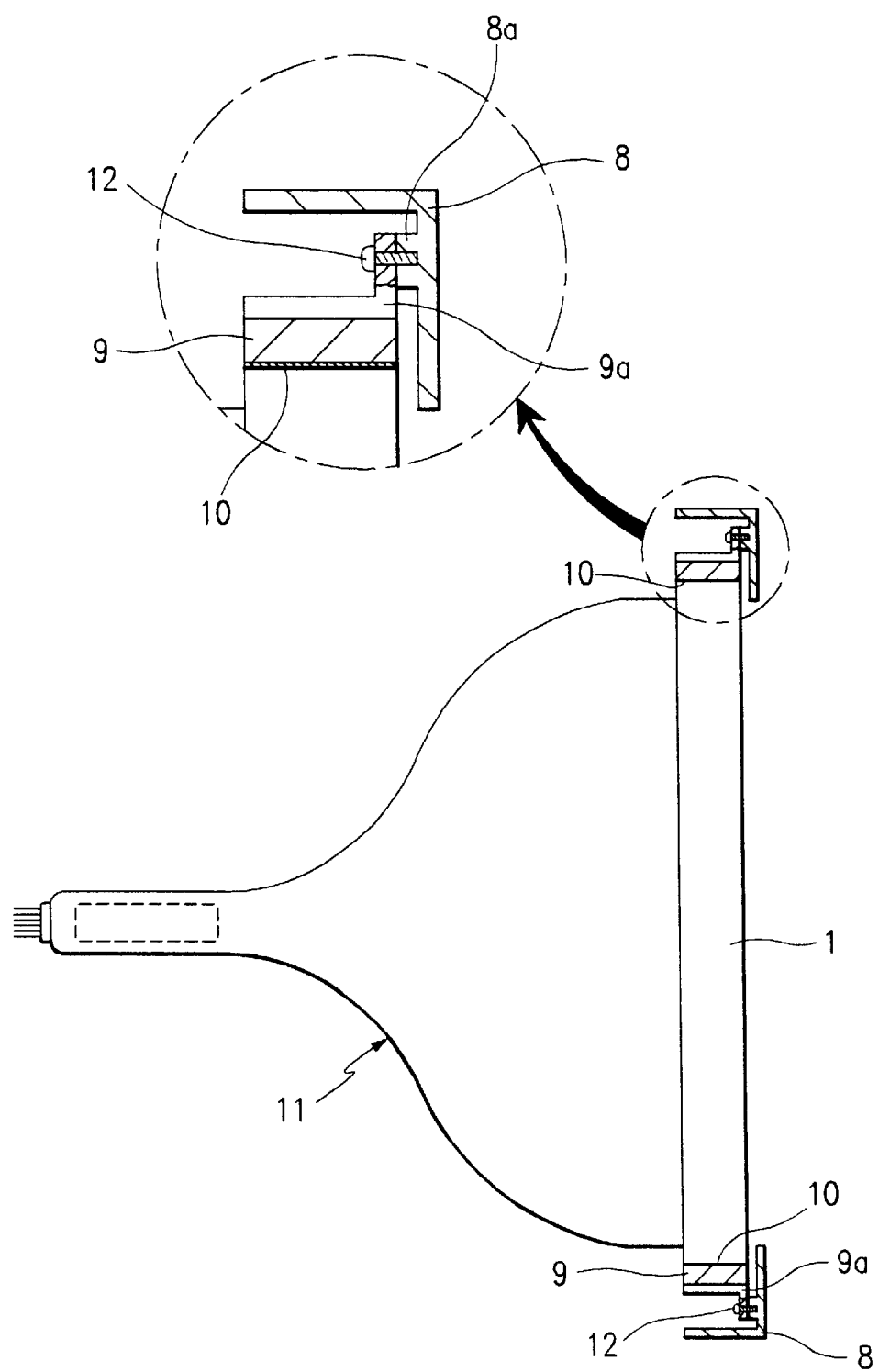
FIG. 3 illustrates a section showing a related art fastening of a flat Braun tube and a cabinet portion.

Reference will now be made in detail to the preferred embodiments of the present invention, examples of which are illustrated in the accompanying drawings.

The structure for fastening a flat Braun tube to a cabinet of the present invention includes front and rear cabinet portions 13 and 14, a flange 1b on an outer rim of a panel 1 forming a flange about the flat Braun tube, a seat 13a formed inside the front cabinet portion 13 for seating the flange 1b, and a supporting member 15 for supporting a back surface of the flange 1b.

In general, the flat Braun tube has an outer rim of the panel 1 that extends beyond an outer circumference surface of the funnel 3, and is mounted so as to prevent explosion of the flat Braun tube. This extended portion is the flange 1b. The flange 1b is of special use in related art fastening devices which use a compression band. In the present invention, the flange 1b and separate fastening means are used to obtain a fastening force which does not place stresses on the fragile central portion of a flat screen. The fastening means of the present invention differ depending on different embodiments of fastening systems, which will be explained with reference to the attached drawings.

Figure 4:
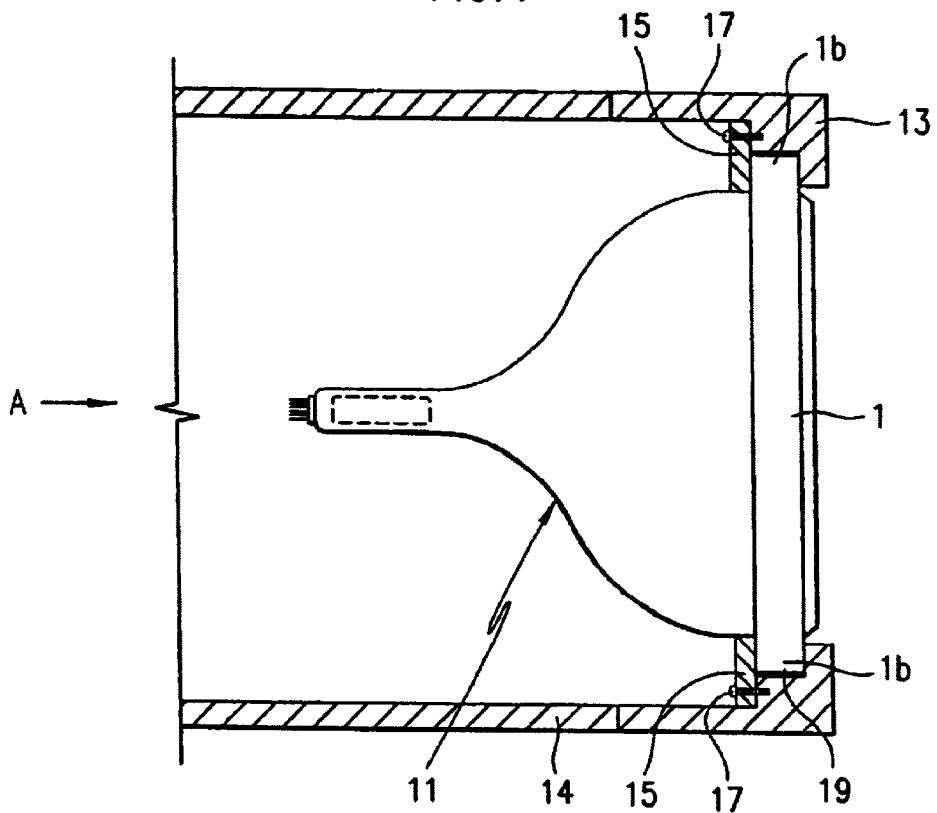
FIG. 4 illustrates a section showing a fastening assembly of a flat Braun tube and a cabinet portion in accordance with a first preferred embodiment of the present invention.
Figure 5:
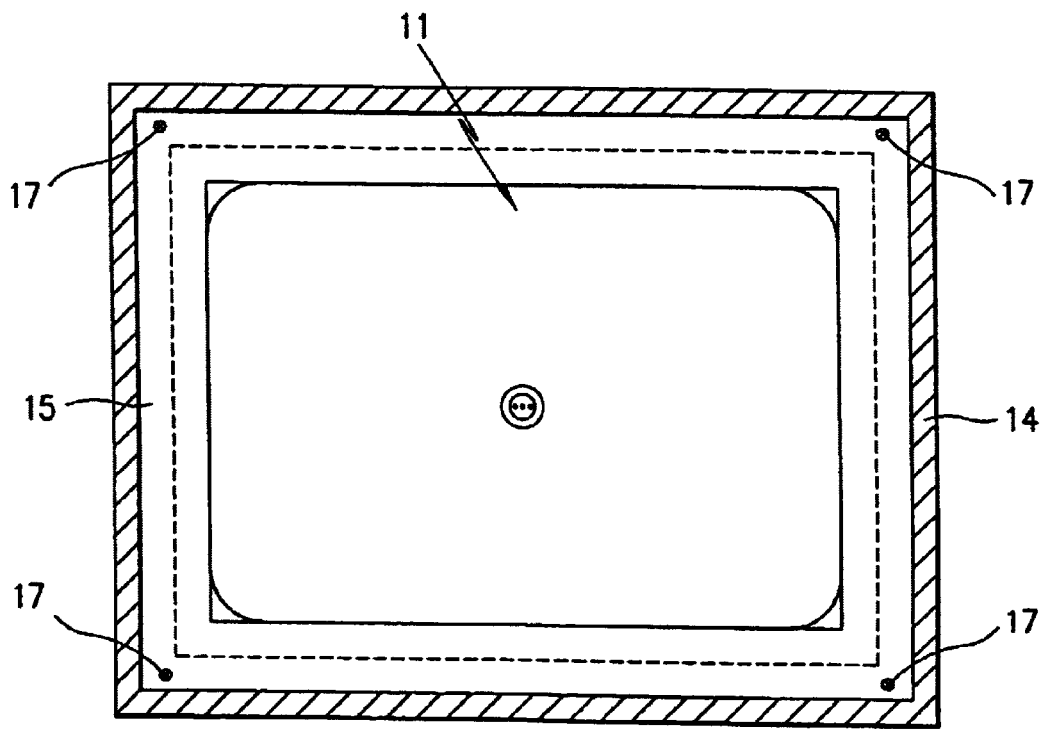
FIG. 5 illustrates the fastening of a flat Braun tube and a cabinet portion in FIG. 4 seen from 'A'.

Referring to FIGS. 4 and 5, the structure for fastening a flat Braun tube to a cabinet portion in accordance with a first preferred embodiment of the present invention includes a seat 13a inside a front cabinet portion 13 for seating a flange 1b of the panel 1, a space 19 formed between the flange 1b and a top and bottom portions of the seat 13a, and a supporting member 15 for supporting a back surface of the flange 1b seated on the seat 13a. The seat 13a is shaped so as to support a front surface of the flange 1b to prevent the panel 1 from separating orthogonally of the longitudinal axis of the Braun tube. The supporting member 15 is preferably a supporting plate and, more particularly, as shown in FIG. 5, the supporting member 15 is shaped as a rectangular frame for supporting either an entire back surface of the flange 1b or required portions only (not shown).

Figure 6:
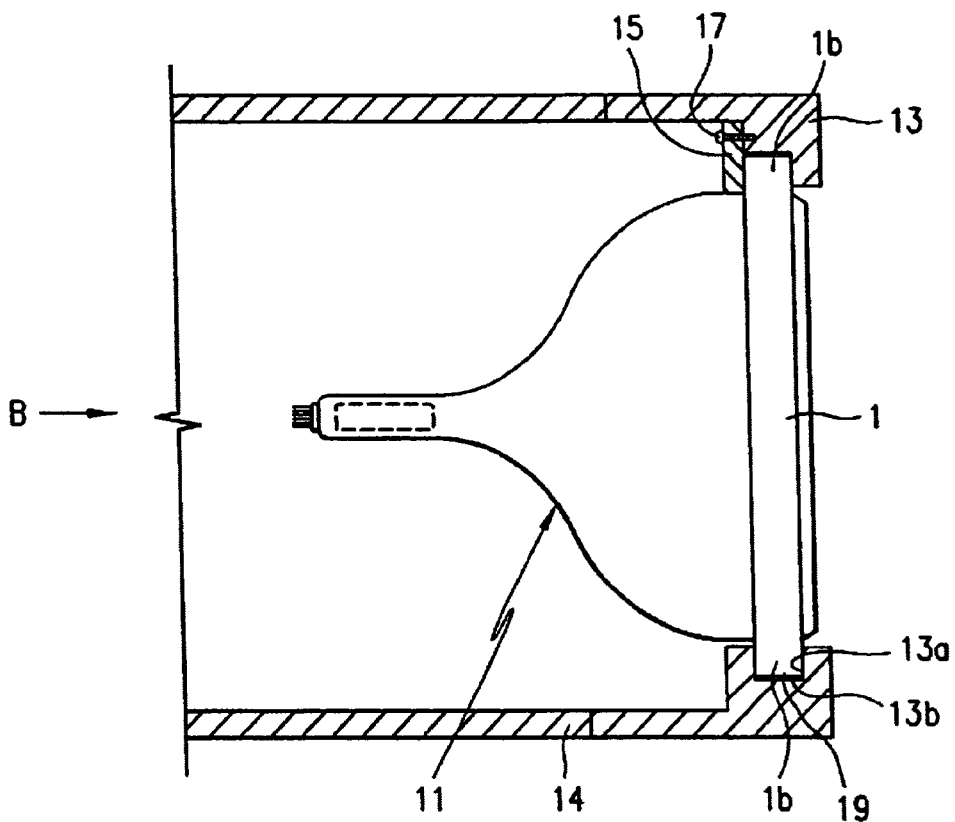
FIG. 6 illustrates a section showing a fastening of a flat Braun tube and a cabinet portion in accordance with a second preferred embodiment of the present invention.
Figure 7:
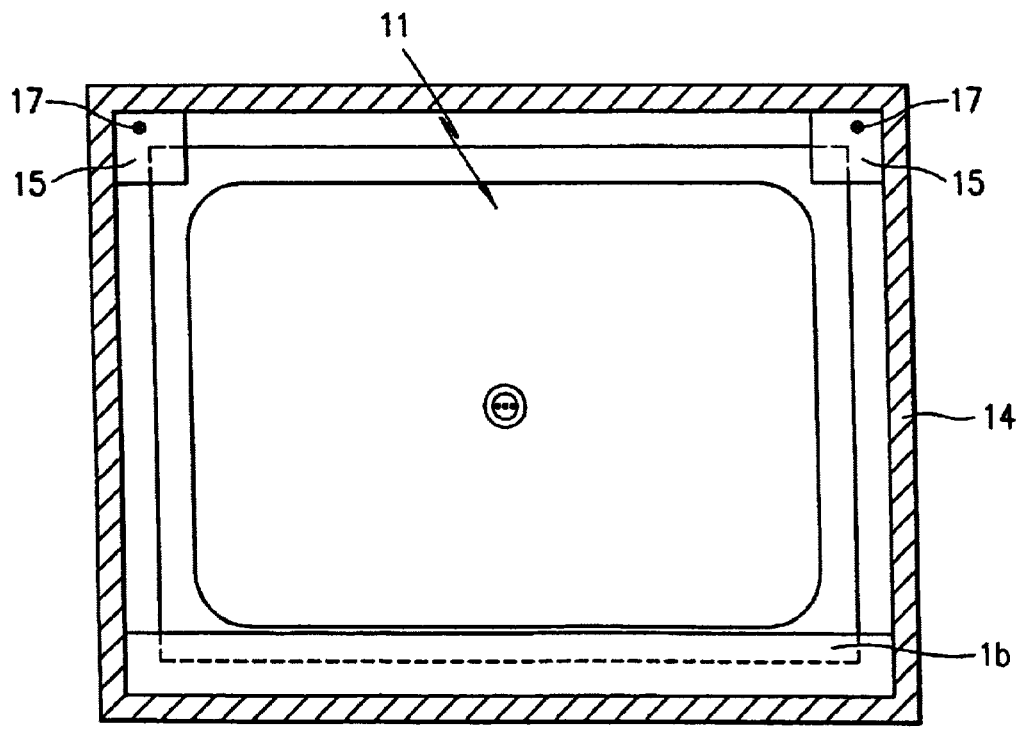
FIG. 7 illustrates the fastening of a flat Braun tube and a cabinet in FIG. 6 seen from 'B'.

Referring to FIGS. 6 and 7, the structure for fastening a flat Braun tube to a cabinet portion in accordance with a second preferred embodiment of the present invention includes a groove 13b formed inside a first side of a front cabinet portion 13 for inserting and holding a portion of the flange 1b of the panel 1, a seat 13a formed inside a second side of the front cabinet portion 13 for seating another portion of the flange 1b of the panel 1, and a supporting member 15 for supporting a back surface of the flange 1b orthogonally of the tube axis. The second embodiment is a hybrid in which one portion of the flange 1b is held by the groove 13b, and the other portion of the flange 1b is supported by the supporting member 15.

Figure 8:
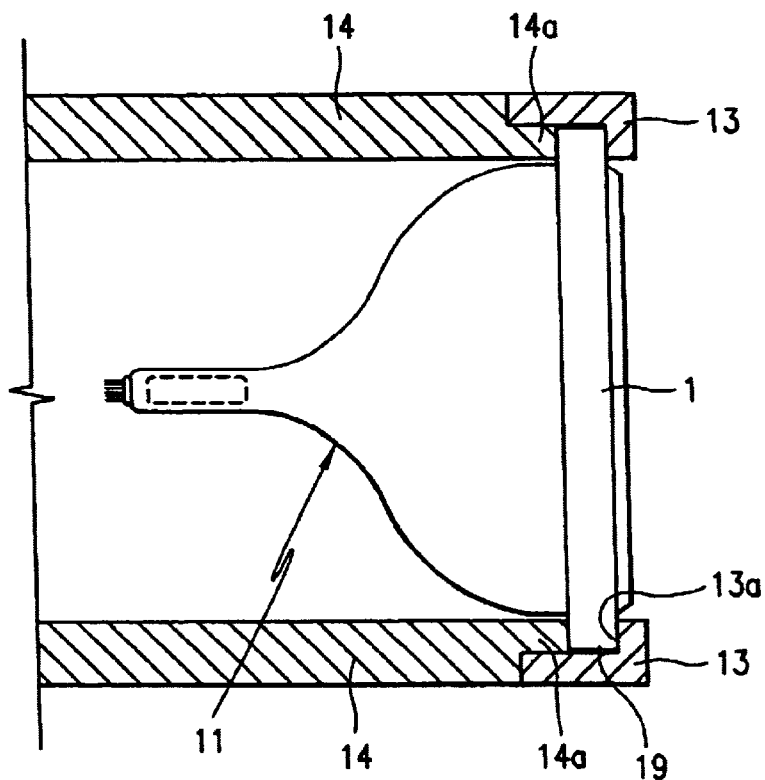
FIG. 8 illustrates a section showing a fastening of a flat Braun tube and a cabinet in accordance with a third preferred embodiment of the present invention.

Referring to FIG. 8, the structure for fastening a flat Braun tube to a cabinet in accordance with a third preferred embodiment of the present invention includes a seat 13a formed inside of a front cabinet portion 13 for seating the flange 1b of the panel 1, a space 19 formed between the flange 1b and a top and bottom portions of the seat 13a, and a supporting portion 14a formed extended from a panel side end of a rear cabinet portion 14 for supporting the flange 1b, for holding the flange 1b by inserting the flange 1b between the front cabinet portion 13 and the rear cabinet portion 14.

The different embodiments of the present invention will be explained in more detail hereinafter.

In the first embodiment, fastening of the Braun tube 11 inclusive of the panel 1 to the front cabinet portion 13 is finished by seating the flange 1b of the panel 1 on the seat 13a of the front cabinet portion 13, forming the space 19 between the flange 1b and the top and bottom portions of the seat 13a, and placing and fastening the supporting member 15 onto the back surface of the seated flange 1b with fastening members. The entire back surface of the flange 1b is supported by supporting member 15, which has a rectangular frame shape and firmly fastens the Braun tube 11 to the front cabinet 13. The space 19 causes compression forces to be limited to directions orthogonal to the tube axis. Opposite to this, localized support of the flange 1b at corners with the supporting member 15 can save material cost and reduce product weight, and more efficiently than in the first embodiment.

In the second embodiment, fastening of the Braun tube 11 to the front cabinet portion 13 can be done by inserting a first portion of the flange 1b of the panel 1 into the groove 13b in the front cabinet portion 13, and placing and fastening the supporting member 15 onto a second portion of the flange 1b of the panel 1 which is not provided with fastening members at a back surface thereof in the same manner as in the first embodiment. The first portion of the panel 1 is held as it is inserted in the groove 13b, and the second portion of the panel 1 is held by the supporting member 15. Accordingly, the size of the portions fastened by the supporting member 15 can be reduced from the first embodiment, since the portion inserted in the groove 13b requires no localized fasteners with the supporting member 15.

In the third embodiment, fastening of the Braun tube 11 to the front cabinet portion 13 can be done by seating the flange 1b of the panel 1 onto the seat 13a in the front cabinet portion 13, and placing the supporting portion 14a extending from a panel side end of a rear cabinet 14 to support the flange 1b. As the third embodiment fastening structure can dispense with the localized, discrete fastening members used in the first and second embodiment fastening structures, the fastening process is simple and easy to use compared to other embodiments.

Figure 9:
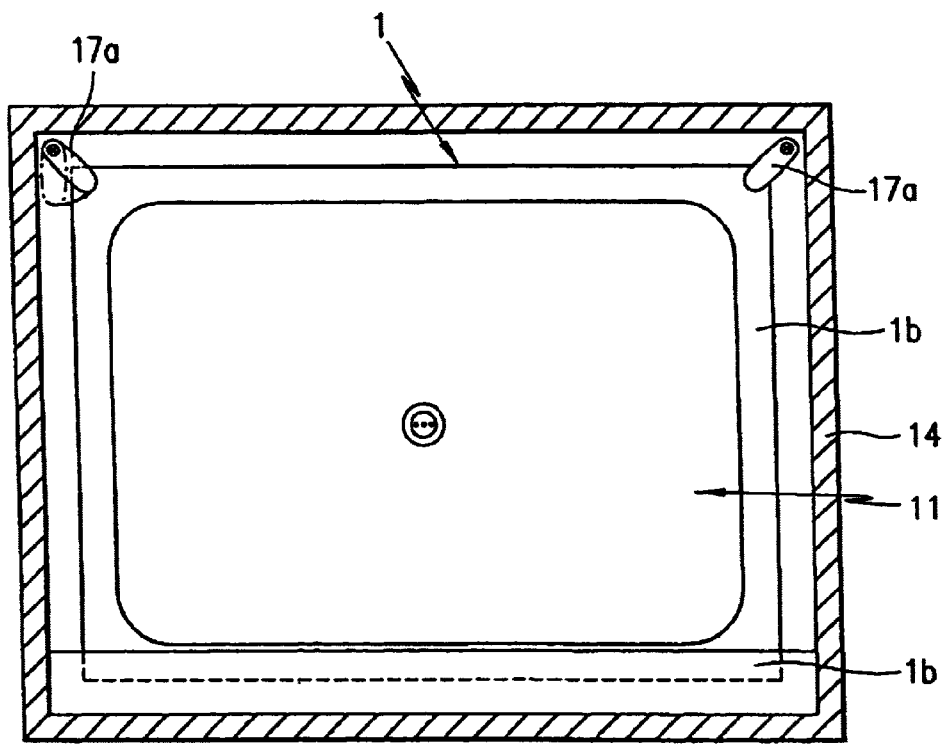
FIG. 9 illustrates an enlarged view of key parts showing lever-type clips for fastening a support plate to a front cabinet portion in accordance with the present invention.

The discrete fastening members in the first and second embodiments may be screws, bolts, or lever-type clips 17a, as shown in FIG. 9.

As has been explained, the provision of the simple fastening means for fastening a flat Braun tube to a cabinet portion of the present invention instead of a circumferential compression band can simplify the assembly, improve fastening force and reduce stresses on the fragile central portion of the screen.

It will be apparent to those skilled in the art that various modifications and variations can be made in the structure for fastening a flat Braun tube to a cabinet of the present invention without departing from the spirit or scope of the invention. Thus, it is intended that the present invention cover the modifications and variations of this invention provided they come within the scope of the appended claims and their equivalents.

What is claimed is:

1. In combination, a structure for fastening a flat Braun tube to a cabinet, a cabinet portion and the flat Braun tube, comprising:

said flat Braun tube including a substantially flat panel;
   a front cabinet portion and a rear cabinet portion;
   an extension forming a flange around a funnel and the flat panel of the Braun tube, the flange having front and rear surfaces disposed in planes perpendicular to a longitudinal axis of the Braun tube and peripheral edges therebetween;
   a seat formed inside of the front cabinet portion for seating the flange; and
   a supporting member having a back surface for constraining the rear surface of the flange, such that constraining forces are applied between said seat and are limited to directions perpendicular to the front and rear surfaces of the flange, wherein a space is formed between said peripheral edges of the flange and said seat so that substantially no compression forces are applied against said peripheral edges of the flange in directions lying in planes parallel to the front and rear surfaces of the flange.

2. A structure as claimed in claim 1, wherein the back surface of the extension is supported by the supporting member, entirely.

3. A structure as claimed in claim 2, wherein the supporting member is a plate.

4. A structure as claimed in claim 3, wherein the plate is fastened to the front cabinet portion by a fastening member.

5. The structure of claim 1, said flat Braun tube further including a rail bonded on a rear surface of the panel, and a flat tension mask attached to the rail.

6. A structure as claimed in claim 1, wherein only discrete portions of the back major surface of the flange are supported by the supporting member.

7. The structure in claim 6, wherein the supporting member is a supporting plate.

8. In combination, a structure for fastening a flat Braun tube to a cabinet, a cabinet portion and the flat Braun tube, comprising:

said flat Braun tube including a substantially flat panel, and a flat tension mask attached to the rail;
   a front cabinet portion and a rear cabinet portion;
   an extension forming a flange about a funnel and the flat panel of the Braun tube, said flange having front and rear surfaces disposed in planes perpendicular to a longitudinal axis of the Braun tube and peripheral edges therebetween;
   a seat formed in one portion of the inside of the front cabinet portion for seating against the front surface of the flange;
   a groove formed in a portion of the inside of the front cabinet portion for inserting the edges of the flange thereinto; and
   a supporting member for constraining the rear surface of the flange seated onto said seat, such that constraining forces are applied between said seat and are limited to directions perpendicular to front and rear surfaces of the flange, wherein a space is formed between said peripheral edges of the flange and said seat so that substantially no compression forces are applied against said peripheral edges of the flange in directions lying in planes parallel to the front and rear surfaces of the flange.

9. The structure of claim 8, said flat Braun tube further including a rail bonded on a rear surface of the panel, and a flat tension mask attached to the rail.

10. In combination, a structure for fastening a flat Braun tube to a cabinet, a cabinet portion and the flat Braun tube, comprising:

said flat Braun tube including a substantially flat panel, and a flat tension mask attached to the rail;
    a front cabinet portion and a rear cabinet portion;
    an extension forming a flange about a funnel and the flat panel of the Braun tube, said flange having front and rear surfaces disposed in planes perpendicular to a longitudinal axis of the Braun tube and peripheral edges therebetween;
    a seat formed inside of the front cabinet portion for seating against the front surface of the flange; and
    a supporting portion extended from the rear cabinet portion constraining the rear surface of the flange, such that constraining forces are applied between said seat and are limited to directions perpendicular to the front and rear surfaces of the flange, wherein a space is formed between said peripheral edges of the flange and said seat so that substantially no compression forces are applied against said peripheral edges of the flange in directions lying in planes parallel to the front and rear surfaces of the flange.

11. The structure of claim 10, said flat Braun tube further including a rail bonded on a rear surface of the panel, and a flat tension mask attached to the rail.

* * * * *